3,126,278
LEAD BASE ALLOY
Willis G. MacLelland, Hastings on Hudson, N.Y., assignor to Anaconda Wire and Cable Company, New York, N.Y., a corporation of Delaware
No Drawing. Filed Dec. 30, 1960, Ser. No. 79,495
6 Claims. (Cl. 75—166)

The present invention relates to a lead base alloy and more particularly to a lead base alloy adapted for use as electric cable sheathing.

It is well known that alloys composed substantially of lead find a particular use as electric cable sheathing. The many different lead base alloys used solve various problems of sheathing and, therefore, provide various advantages. However, one problem has persisted; namely, the problem of a lack of physical homogeneity of the lead sheath at what is known as the sheath "stop mark" and "charge-weld" areas.

In sheathing an electric cable with a lead base alloy, typically a heated alloy charge in an intermittent type of extruder is pressurized by a ram moving inwardly causing the alloy to be forced out the extruder die and around the electric cable to form a sheath. When the ram reaches the limit of its inward travel, it is drawn outwardly, exposing the face of the alloy remaining in the cylinder. Another or new charge of heated alloy is added to the cylinder. The area of cross section between the old and new charges of alloy is known as the "charge-weld" area in an intermittent lead press type of extruder. When extruded out around the cable, this area is known as the "critical area" of the sheath. The "critical area" contains varying amount of segregated and embedded lead oxides or dross. It may include from 40 to 70 feet of extruded sheath and typically begins approximately 20 feet from the "stop mark." The "stop mark" designates the area of the sheath that remained in and immediately adjacent the die during the period extrusion was stopped, for recharging of the press or any other reason, which causes a physical discontinuity producing a weakness of the sheath at the area. The segregated and embedded lead oxide in the "critical area" also causes a physical discontinuity, also producing a weakness of the cable sheath. Like the weakest link in a chain, the strength of the sheath through these areas may determine its life, and likewise, the life of the cable.

The electric cable, after sheathing, is rolled onto a reel for transportation to the location of use and then unreeled and laid. In laying the cable, provisions must be made for expansion and contraction of the cable due to changes in the temperature of the cable resulting from the cyclic daily increase and decrease in the power passed through the cable and from the cyclic ambient temperature changes of the surrounding environment. These provisions may take the form of a loop of cable in an expansion chamber located at spaced distances long the length of the cable when laid. The bending of the cable in reeling and unreeling, and in the expansion chamber due to the expansion and contraction of the cable results in cold working of the lead alloy sheathing. This cold working of the sheathing occurring at a "stop mark" or "critical area" exploits their physical weakness to an extent such that fatigue failure of the sheath occurs, requiring the cable to be replaced.

The present invention resides in adding a small amount of tellurium, and nickel or silver to any of the commercially available leads. This addition surprisingly inhibits dross formation causing the old and new charges in the extruder to completely fuse or weld together, resulting in a completely homogeneous mass and a resulting sheath without "critical areas" of physical weakness. The addition also unexpectedly causes the "stop mark" areas to have greater strength. More specifically, it has been found that lead base alloys containing by weight from about 0.01% to 0.15% of tellurium, and from about 0.0005% to 0.1% of nickel or silver are particularly useful as electric cable sheathing. Preferred lead base alloys are those containing from 0.05% to 0.1% of tellurium, and from 0.001% to 0.04% nickel or silver, with a preferred ratio of 25 parts tellurium to each part nickel or silver. Such small additions of tellurium and nickel or silver to lead produces an alloy, which, when used as sheathing for an electric cable, causes the cable to have a greatly extended life due, at least in part, to its increased strength.

Commercially available leads are classified by the industry as, for example, acid lead, chemical lead, common lead, corroding lead, debismuthized lead, and copper-bearing lead. While the addition of tellurium, and nickel or silver to any commercially available lead in the above-specified amounts will produce an alloy which when used as a cable sheath will have phyiscal uniformity throughout its length, good results have been obtained particularly when using a copper-bearing lead. For example, an alloy composed of 0.06% copper, 0.06% tellurium, 0.003% nickel, and the balance lead, except for impurities, produces a cable sheath having surprisingly physical uniformity, especially at the "critical area" as indicated by relatively uniform cold bend and physical test values throughout the resultant sheath. This exceptional uniformity is believed due, at least in part, to the tendency of the additions to inhibit dross formation in the lead alloy both in the kettle and in the extruder, thereby allowing excellent fusion of the old and new charges in the "charge-weld" area and producing a "critical area" of sheath of physical uniformity equivalent to that of the ordinary running length of sheath.

Tests conducted on pipe lengths of from 15 to 40 feet of a cable sheathed with a regular copper-bearing lead alloy not containing tellurium, and nickel or silver showed varying maximum and minimum cold bend values through the critical charge-weld areas, especially insofar as the minimum value is concerned, indicating a lack of physical uniformity. A length of this cable sheath outside the "critical area" withstood less than 7000 flexations before fatigue failure at a regular portion of the extruded length, less than 5000 flexations at one "stop mark," and only 3000 flexations at another "stop mark." On the other hand, similar tests conducted on the similar lengths of a cable sheathed with the alloy of this invention withstood over 20,000 flexations along a regular portion of the extruded length, over 18,000 flexations at one "stop mark" of the extruded length, and over 15,000 flexations at another "stop mark" of the extruded length before fatigue failure and showed relatively uniform maximum and minimum cold bend values through the critical charge-weld areas comparable to the outside length indicating physical uniformity. Since flexations are a major cause of fatigue failure of lead-sheathed cables, as pointed out previously, these test results clearly illustrate the remarkable increase in cable life that are obtained by a small addition of telluruim, and nickel or silver to the lead alloy of the cable sheath. Cable sheaths composed of such alloys have withstood an internal pressure of 15,000 pounds per square inch for 1000 minutes before bursting. In comparison, the regular copper-bearing lead alloy cable sheath withstood the same pressure for only 100 minutes. Since this pressure is quite high and, therefore, somewhat unrealistic, the cable sheaths were also tested at a pressure of 100 pounds per square inch, at which pressure the special alloy cable sheath of the invention burst after 18,800 minutes while the regular copper-bearing lead cable sheath burst after only 3200 minutes. Furthermore, the extruded alloy of the invention gave exceptional cleanliness and physical uniformity to the cable sheath. It offers no extrusion difficulties. The alloy did not appear to be hot-short, and does not age-harden or age-soften.

A cable sheath composed of the alloy of the invention can be extruded by an intermittent lead press at twice the speed of other commercial lead alloys such as an arsenical lead alloy without heat checking. A cable sheath composed of the alloy does not require heat treatment for homogeneity, only the normal water quench. A microexamination of the "critical area" of the cable sheath composed of the present alloy disclosed an exceptionally clean charge weld lacking the customary oxide inclusions prevalent in sheaths composed of other commercially available alloys and disclosed an exceedingly uniform fine grain microstructure interlocked across the regular weld areas, indicating physical uniformity.

To illustrate the similarity of a lead base alloy containing tellurium and nickel to a lead base alloy containing tellurium and silver, the following test results are cited:

| Type Lead | Tellurium, percent | Nickel, percent | Silver, percent | Tensile Str. | Percent Elong. |
|---|---|---|---|---|---|
| Copper-Bear. (Acid Lead) | None | None | None | 2,058 | 55.0 |
| Do | 0.06 | 0.0025 | None | 2,628 | 72.5 |
| Do | 0.06 | None | 0.0025 | 2,648 | 80.0 |

These test results also illustrate the superiority of the tellurium-nickel and the tellurium-silver lead base alloys to the commercially available copper-bearing (acid lead) lead alloy.

While reference heretofore has been made to an alloy consisting essentially of tellurium, and nickel or silver, it is to be understood that both nickel and silver may be used in combination as an alloying constituent with tellurium for any commercially available lead.

I claim:

1. A lead base alloy consisting essentially of from about 0.05% to 0.1% tellurium, from about 0.001% to 0.04% of at least one metal of the group consisting of nickel and silver and the balance lead, the ratio of tellurium to the metal of said group being about 25 to 1.

2. A lead base alloy consisting essentially of from about 0.05% to 0.1% tellurium, from about 0.001% to 0.04% nickel and the balance lead.

3. A cable having a sheath formed of a lead base alloy, said sheath including a stop mark and said alloy consisting essentially of from about 0.01% to 0.15% tellurium, from about 0.0005% to 0.1% of at least one metal of the group consisting of nickel and silver and the balance lead, the alloy at the stop mark being physically uniform and possessing a fatigue strength substantially as high as the alloy at points remote from the stop mark.

4. A cable having a sheath formed of a lead base alloy consisting essentially of from about 0.05% to 0.1% tellurium, from about 0.001% to 0.04% of at least one metal of the group consisting of nickel and silver and the balance lead, the ratio of tellurium to the metal of said group being about 25 to 1.

5. A cable having a sheath formed of a lead base alloy consisting essentially of from about 0.05% to 0.1% tellurium, from about 0.001% to 0.04% nickel and the balance lead.

6. A cable having a sheath formed of a lead base alloy, said sheath including a stop mark and said alloy consisting essentially of from about 0.05% to 0.1% tellurium, from about 0.001% to 0.04% silver and the balance lead, the alloy at the stop mark being physically uniform and possessing a fatigue strength substantially as high as the alloy at points remote from the stop mark.

References Cited in the file of this patent

UNITED STATES PATENTS 2,499,566     Bouton _____ Mar. 7, 1950

FOREIGN PATENTS 449,372     Great Britain _____ June 25, 1936
814,445     Great Britain _____ June 3, 1959